(12) United States Patent
Han et al.

(10) Patent No.: US 12,525,678 B2
(45) Date of Patent: Jan. 13, 2026

(54) BATTERY MODULE AND BATTERY PACK INCLUDING THE SAME (71) Applicant: LG ENERGY SOLUTION, LTD., Seoul (KR)

(72) Inventors: Honggoo Han, Daejeon (KR); Won Kyoung Park, Daejeon (KR); Junyeob Seong, Daejeon (KR); Hyun Seop Yun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 680 days.

(21) Appl. No.: 17/907,908

(22) PCT Filed: Oct. 18, 2021

(86) PCT No.: PCT/KR2021/014434
§ 371 (c)(1),
(2) Date: Aug. 29, 2022

(87) PCT Pub. No.: WO2022/097960
PCT Pub. Date: May 12, 2022

(65) Prior Publication Data
US 2023/0136762 A1 May 4, 2023

(30) Foreign Application Priority Data
Nov. 5, 2020 (KR) .................. 10-2020-0146614

(51) Int. Cl.
*H01M 10/613* (2014.01)
*H01M 10/653* (2014.01)
(Continued)

(52) U.S. Cl.
CPC ....... *H01M 50/271* (2021.01); *H01M 10/613* (2015.04); *H01M 10/653* (2015.04);
(Continued)

(58) Field of Classification Search
CPC ............. H01M 50/271; H01M 10/613; H01M 10/653; H01M 10/6554; H01M 10/6556;
(Continued)

(56) References Cited

U.S. PATENT DOCUMENTS 9,203,068 B2 12/2015 Utley et al.
2012/0003526 A1 1/2012 Kume et al.
(Continued)

FOREIGN PATENT DOCUMENTS

CN 104851996 A 8/2015
CN 107706325 A 2/2018
(Continued)

OTHER PUBLICATIONS

Supplementary European Search Report for European Application No. 21889425.1, dated Mar. 21, 2024.
(Continued)

*Primary Examiner* — Muhammad S Siddiquee
(74) *Attorney, Agent, or Firm* — Birch, Stewart, Kolasch & Birch, LLP (57) ABSTRACT A battery module includes a cell block assembly having a battery cell stack in which a plurality of battery cells are stacked and a busbar frame mounted on at least one of the front and rear surfaces of the battery cell stack, a module frame that houses the cell block assembly and is opened in the front and rear surfaces, an upper plate that covers the upper surface and front and rear surfaces of the cell block assembly, and a cross beam that is disposed adjacent to a side surface part of an upper plate covering the front and rear surfaces of the cell block assembly, and is formed in a straight line shape. The cell block assembly includes a first cell block assembly and a second cell block assembly arranged side by side in a longitudinal direction of the battery cell. The first cell block assembly and the second cell (Continued)

block assembly are arranged separately from each other so that the busbar frames mounted on the first and second cell block assemblies face each other.

12 Claims, 6 Drawing Sheets

(51) Int. Cl.
  *H01M 10/6554* (2014.01)
  *H01M 10/6556* (2014.01)
  *H01M 50/211* (2021.01)
  *H01M 50/262* (2021.01)
  *H01M 50/271* (2021.01)
(52) U.S. Cl.
  CPC ... *H01M 10/6554* (2015.04); *H01M 10/6556* (2015.04); *H01M 50/211* (2021.01); *H01M 50/262* (2021.01)
(58) Field of Classification Search
  CPC ............ H01M 50/211; H01M 50/262; H01M 50/204; H01M 2220/20; H01M 10/625; H01M 50/20; Y02E 60/10
  See application file for complete search history.

(56) References Cited

U.S. PATENT DOCUMENTS

| | | | |
|---|---|---|---|
| 2013/0004822 A1 | 1/2013 | Hashimoto et al. | |
| 2014/0220391 A1* | 8/2014 | Fujii | H01M 50/264 429/7 |
| 2015/0236314 A1 | 8/2015 | Lee et al. | |
| 2017/0012330 A1 | 1/2017 | Kim et al. | |
| 2018/0026243 A1 | 1/2018 | Stojanovic et al. | |
| 2018/0183117 A1 | 6/2018 | Cho et al. | |
| 2019/0157642 A1 | 5/2019 | Toyota | |
| 2019/0326569 A1 | 10/2019 | Chi et al. | |
| 2020/0144580 A1* | 5/2020 | Hong | H01M 50/522 |
| 2020/0274213 A1 | 8/2020 | Cho et al. | |
| 2020/0381694 A1* | 12/2020 | Rath | H01M 10/653 |
| 2020/0411814 A1* | 12/2020 | Ju | H01M 50/236 |
| 2021/0066770 A1* | 3/2021 | Koyama | H01M 10/647 |
| 2021/0336287 A1 | 10/2021 | Kim et al. | |
| 2023/0352766 A1 | 11/2023 | Hwang et al. | |

FOREIGN PATENT DOCUMENTS

| | | |
|---|---|---|
| CN | 109148771 A | 1/2019 |
| CN | 109802062 A | 5/2019 |
| CN | 209963117 U | 1/2020 |
| CN | 110970094 A | 3/2020 |
| CN | 111416076 A | 7/2020 |
| DE | 10 2011 107 007 A1 | 1/2013 |
| DE | 10 2016 205 929 A1 | 10/2017 |
| DE | 10 2018 109 470 A1 | 10/2019 |
| JP | 2011-129311 A | 6/2011 |
| JP | 2012-84239 A | 4/2012 |
| JP | 2019-96385 A | 6/2019 |
| JP | 2020-35711 A | 3/2020 |
| KR | 10-2015-0099965 A | 9/2015 |
| KR | 10-2016-0146587 A | 12/2016 |
| KR | 10-2018-0113906 A | 10/2018 |
| KR | 10-2019-0074759 A | 6/2019 |
| KR | 10-2029407 B1 | 10/2019 |
| KR | 10-2020-0017818 A | 2/2020 |
| KR | 10-2020-0021608 A | 3/2020 |
| KR | 10-2020-0086170 A | 7/2020 |
| WO | WO 2016/135786 A1 | 9/2016 |

OTHER PUBLICATIONS

International Search Report for PCT/KR2021/014434 mailed on Feb. 3, 2022.

\* cited by examiner

BATTERY MODULE AND BATTERY PACK INCLUDING THE SAME

TECHNICAL FIELD

Cross Citation with Related Application(s)

This application claims the benefit of Korean Patent Application No. 10-2020-0146614 filed on Nov. 5, 2020 with the Korean Intellectual Property Office, the disclosure of which is incorporated herein by reference in its entirety.

The present disclosure relates to a battery module and a battery pack including the same, and more particularly, to a battery module having an expandable structure and a battery pack including the same.

BACKGROUND

A secondary battery attracts significant attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery module may include a battery cell stack in which a plurality of battery cells are stacked, a module frame that houses the battery cell stack, and an insulating cover and an end plate that cover both side surfaces of the battery cell stack.

Conventionally, a busbar frame was mounted onto the front and rear surfaces of the battery cell stack that is disposed in a direction perpendicular to the stacking direction of the battery cell stack constituting the battery module. Further, an insulating cover was attached to the outside surface of the busbar frame to cut off electric connection between the battery cell stack and the busbar frame and the outside. Further, an end plate was mounted onto the outside surface of the insulating cover to physically protect the battery cell stack and the electrical components connected thereto. However, when the battery module is produced by separately providing the insulating cover and the end plate in this way, the structure of the battery module may become complicated.

Meanwhile, recently, in the case of battery modules mounted on electric vehicles, various types of battery module structures have been put on the market in order to efficiently utilize the to space inside the vehicle. As the number of cell blocks increases, a demand for an expandable battery module structure capable of utilizing the space inside the vehicle is growing.

At this time, in the case of an expandable battery module structure including at least two or more cell blocks, an insulating cover and an end plate must be separately provided for each battery cell stack when the conventional structure of an end plate and an insulating cover is applied, whereby the weight of the battery module may increase, the production process may be lengthened, and the battery module structure itself may become complicated. In addition, the arrangement of the cooling system for the expandable battery module structure may also be complicated.

DETAILED DESCRIPTION OF THE INVENTION

Technical Problem

It is an object of the present disclosure to provide a battery module capable of simplifying the structure of an expandable battery module.

However, the technical problem to be solved by embodiments of the present disclosure is not limited to the above-described problems, and can be variously expanded within the scope of the technical idea included in the present disclosure.

Technical Solution

In order to achieve the above object, according to one embodiment of the present disclosure, there is provided a battery module comprising: a cell block assembly including a battery cell stack in which a plurality of battery cells are stacked and a busbar frame mounted on at least one of a front surface or a rear surface of the battery cell stack, a module frame housing the cell block assembly, the module frame being in a front surface and a rear surface thereof, an upper plate covering an upper surface and the front and rear surfaces of the cell block assembly; and a cross beam disposed adjacent to a side surface part of the upper plate covering the front and rear surfaces of the cell block assembly, is the cross beam being formed in a straight line shape, wherein the cell block assembly includes a first cell block assembly and a second cell block assembly arranged side by side in a longitudinal direction of the plurality of battery cells, and wherein the first cell block assembly and the second cell block assembly are arranged separately from each other so that the busbar frames mounted on the first and second cell block assemblies face each other.

The upper plate may further comprise a protruding bottom part protruding from the side surface part.

The cross beam may be disposed on the protruding bottom part.

The battery module may further comprise a sealing member formed between the protruding bottom part and the cross beam.

A refrigerant flow path may be formed inside the cross beam to allow refrigerant to flow therethrough.

The first and second cell block assemblies may be disposed along a direction perpendicular to a stacking direction of the battery cell stack.

A cooling plate may be located below a bottom part of the module frame.

Thermal conductive resin layers may be formed between the first and second cell block assemblies and a bottom part of the module frame, and the thermal conductive resin layers may be formed at a lower end on front and rear sides of the first cell block assembly and a lower end on front and rear sides of the second cell block assembly, respectively.

The battery module may further comprise a mounting member located between the first cell block assembly and the second cell block assembly.

The upper plate comprises a connection part that connects spaced apart portions of the first cell block assembly and the second cell block assembly, and the mounting member may couple the connection part and a bottom part of the module frame.

According to another embodiment of the present disclosure, there is provided a battery pack comprising: the battery module described above, and a lower pack housing to which the battery module is mounted, wherein the upper plate further comprises a protruding bottom part protruding from the side surface part, and wherein the protruding bottom part is adjacent to a first side wall part of the lower pack housing.

The battery pack further comprises a first coupling member located between the first side wall part of the lower pack housing and the first cell block assembly, and a second coupling member located between a second side wall part of the lower pack housing and the second cell block assembly, wherein the first coupling member and the second coupling member couple the upper plate and a bottom part of the module frame or the lower pack housing.

Advantageous Effects

According to embodiments of the present disclosure, by eliminating the end plate and insulating cover structure that were conventionally used in an expandable battery module structure, the battery module can be made lightweight, the assembling property can be improved, the unit production cost of the battery module can be reduced, and parts management cost can be reduced by reducing the number of parts.

In addition, by straightening the cooling pipe and eliminating the connection part, it is possible to simplify the structure and reduce in weight.

The effects of the present disclosure are not limited to the effects mentioned above and additional other effects not described above will be clearly understood from the description of the appended claims by those skilled in the art.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Now, a structure of a battery module according to an embodiment of the present disclosure will be described with reference to FIGS. 1 to 6.

Figure 1:
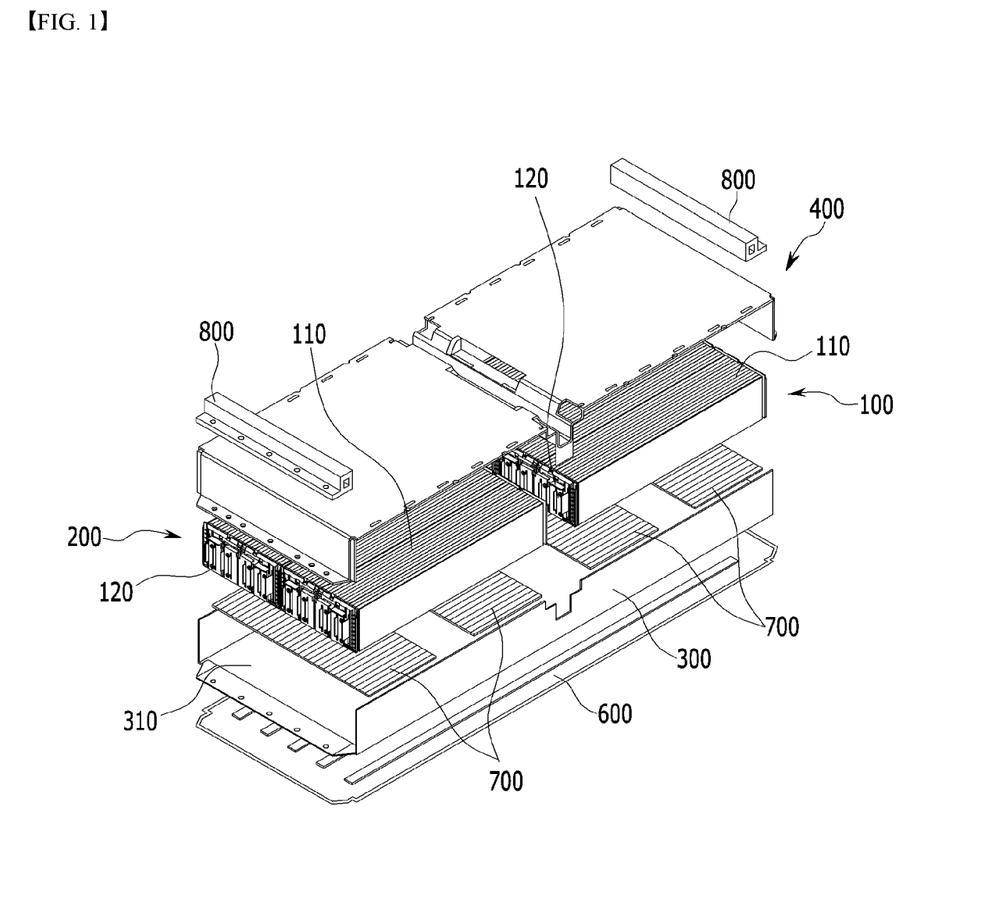
FIG. 1 is an exploded perspective view showing a battery module according to an embodiment of the present disclosure.
Figure 2:
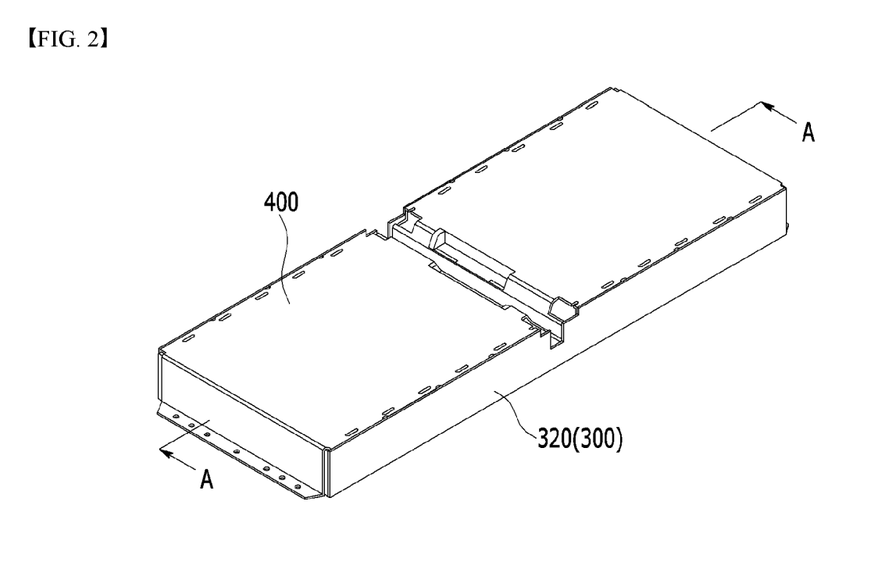
FIG. 2 is a perspective view illustrating a state in which the battery module of FIG. 1 is assembled.
Figure 3:
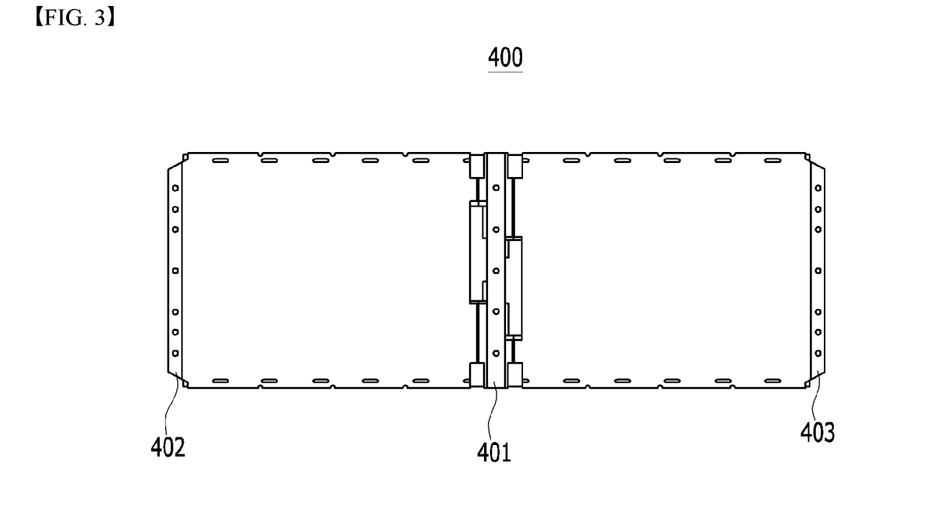
FIG. 3 is a top view of FIG. 2 as viewed from above.
Figure 4:
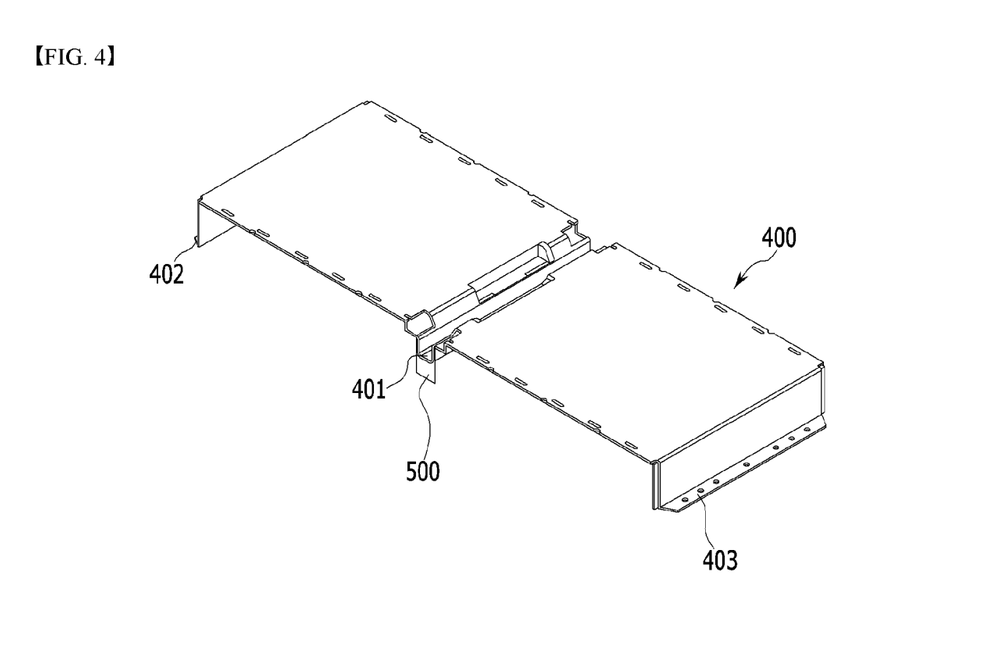
FIG. 4 is a perspective view showing an upper plate according to an embodiment of the present disclosure.
Figure 5:
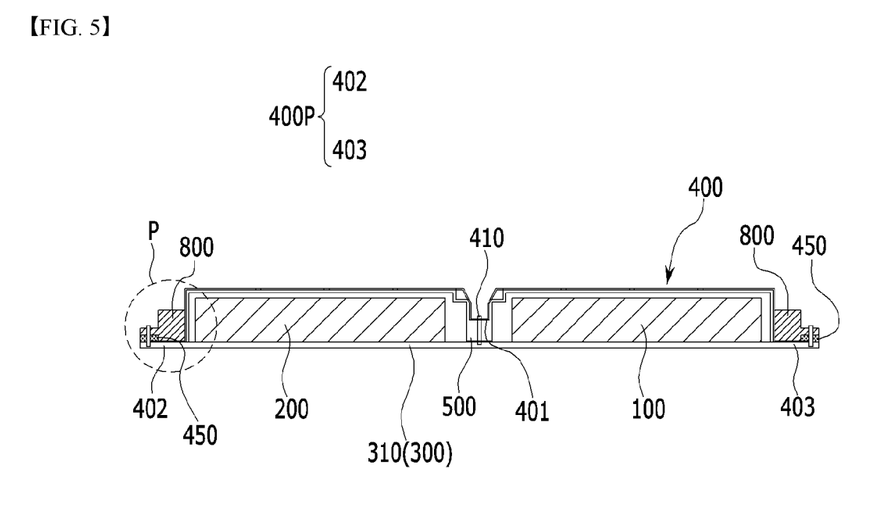
FIG. 5 shows a section A-A of FIG. 2, which is a cross-sectional view of a battery module according to an embodiment of the present disclosure.
Figure 6:
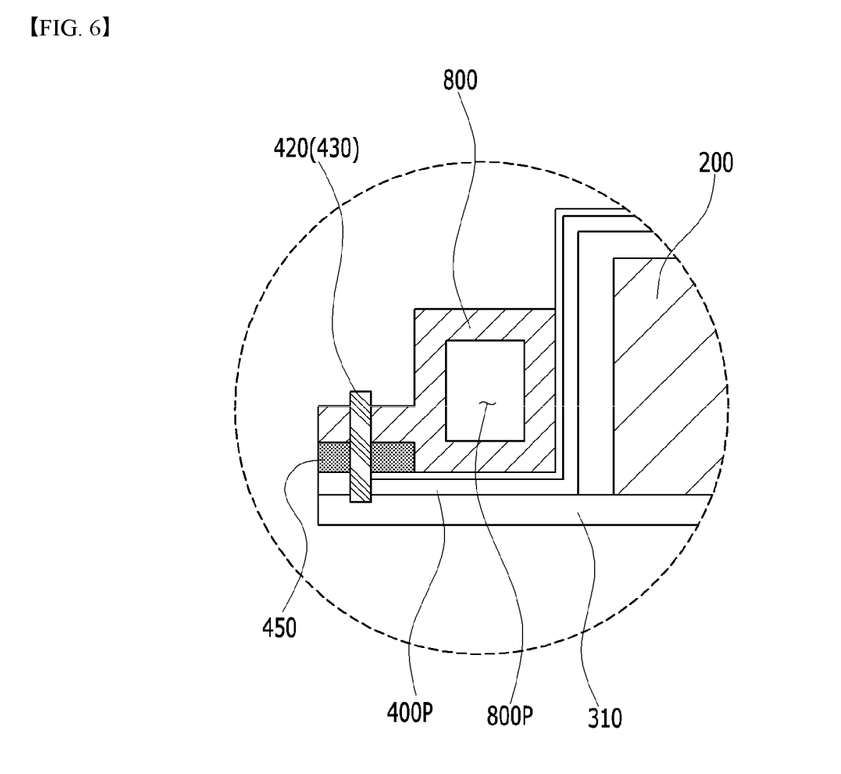
FIG. 6 is an enlarged view of region P of FIG. 5.

FIG. 1 is an exploded perspective view showing a battery module according to an embodiment of the present disclosure. FIG. 2 is a perspective view illustrating a state in which the battery module of FIG. 1 is assembled. FIG. 3 is a top view of FIG. 2 as viewed from above. FIG. 4 is a perspective view showing an upper plate according to an embodiment of the present disclosure. FIG. 5 shows a section A-A of FIG. 2, which is a cross-sectional view of a battery module according to an embodiment of the present disclosure. FIG. 6 is an enlarged view of region P of FIG. 5.

Referring to FIGS. 1 to 6, a battery module according to an embodiment of the present disclosure includes first and second cell block assemblies 100 and 200 including a battery cell stack 110 and a busbar frame 120 mounted on the front and rear surfaces of the battery cell stack 110, a module frame 300 that houses the first and second cell block assemblies 100 and 200 and is opened in a front and rear direction, and an upper plate 400 that covers the upper surface and front and rear surfaces of the first cell block assembly 100 and the upper surface and front and rear surfaces of the second cell block assembly 200. The first cell block assembly 100 and the second cell block assembly 200 included in the battery module may be arranged side by side along the longitudinal direction of the battery cell. The longitudinal direction of the battery cells may be a direction that defines a battery cell spacing between the front and rear surfaces of the first cell block assembly 200 in which the busbar frame 120 is disposed.

The module frame 300 may include a bottom part and at least two side surface parts connected to the bottom part. In particular, at least two side surface parts may be bent at both ends of the bottom part. The module frame 300 may be U-shaped.

At this time, the busbar frame 120 may be mounted on the front and rear surfaces of the first cell block assembly 100, respectively, and a busbar frame 120 may be mounted on the front and rear surfaces of the second cell block assembly 200, respectively. In a state where the busbar frame 120 mounted on one side of the first cell block assembly 100 and the busbar frame mounted on one side of the second cell block assembly 200 are adjacent to each other and face each other, the first cell block assembly 100 and the second cell block assembly 200 may be arranged separately from each other. The upper plate 400 may be coupled to the bottom part of the module frame 300 between the first cell block assembly 100 and the second cell block assembly 200 and on the entire front and rear surfaces of the first and second cell block assemblies 100 and 200.

The battery cell according to the present embodiment is a secondary battery and can be configured into a pouch type secondary battery. The battery cells can be configured by a plurality of numbers, and the plurality of battery cells can be stacked so as to be electrically connected to each other, thereby forming a battery cell stack 110. The plurality of battery cells may include an electrode assembly, a battery case, and an electrode lead protruding from the electrode assembly, respectively.

According to embodiments of the present disclosure, it may be formed as a large-area cell block in which the number of stacked battery cells is greatly increased as compared with the conventional case. The large-area cell block may include a case where about 32 to 48 battery cells are stacked in one cell block to constitute the battery cell stack 110, as compared with the conventional case where about 12 to 24 battery cells are stacked in one cell block.

The module frame 300 can house the first and second cell block assemblies 100 and 200. The module frame 300 is formed of a bottom part 310 and both side surface parts 320, and can cover the lower surface and both side surfaces of the entire first and second cell block assemblies 100 and 200. More specifically, the first and second cell block assemblies 100 and 200 are arranged apart from each other in a direction in which the busbar frames face each other, and the module frame 300 is formed in a size that houses up to the first and second cell block assemblies 100 and 200 and a separation space between the first cell block assembly 100 and the second cell block assembly 200, thereby being able to house the first and second cell block assemblies 100 and 200.

At this time, the first and second cell block assemblies 100 and 200 can be disposed along a direction perpendicular to the stacking direction of the battery cell stack 110.

According to the present embodiment, the upper plate 400 may have a shape in which a plurality of concavo-convex parts are formed so as to integrally cover the upper surface and front and rear surfaces of the first cell block assembly 100 and the upper side surface and front and rear surfaces of the second cell block assembly 200. The upper plate 400 may be formed so as to cover all portions where the busbar frames 120 are located, and at the same time, may be formed so as to cover the upper surfaces of the first and second cell block assemblies 100 and 200. The busbar frame 120 may be formed on the front and rear surfaces of the first cell block assembly 100, and may be formed on the front and rear surfaces of the second cell block assembly 200, respectively.

Figure 8:
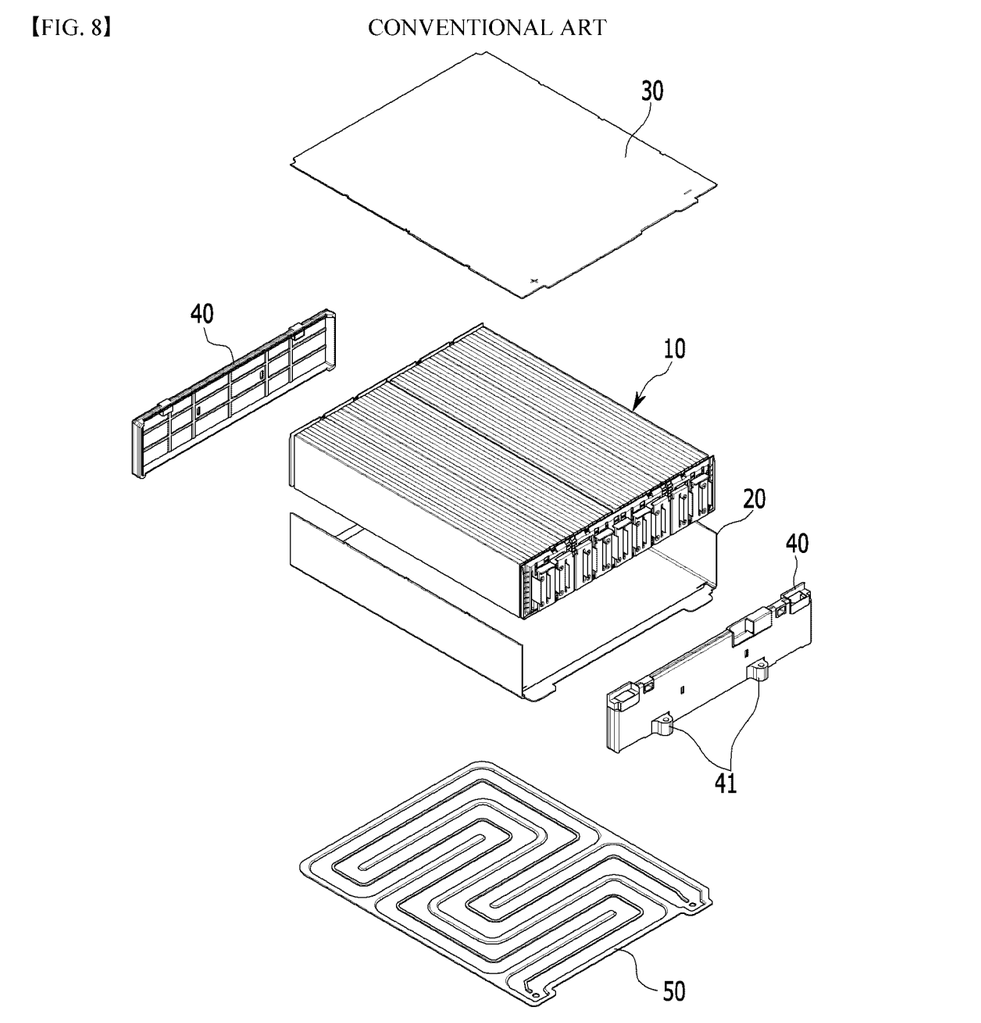
FIG. 8 is a comparative example, which is a view showing a structure including an end plate in a conventional battery module.

FIG. 8 is a comparative example, which is a view showing a structure including an end plate in a conventional battery module.

The conventional battery module includes a battery cell stack 10 formed in a large area, a module frame 20 for housing the battery cell stack 10, an upper plate 30 for covering the upper surface of the battery cell stack 10, an end plate 40 for covering the front and rear surfaces of the battery cell stack 10, and a heat sink 50 formed below the bottom surface of the module frame 20.

At this time, in addition to the module frame 20 for housing the battery cell stack 10, an upper plate 30 covering the upper surface and an end plate 40 covering the front and rear surfaces are separately provided to form a frame structure of the battery cell stack 10. However, in the case of the structure of the end plate 40, it contains an accessory structure that requires a certain level of strength, for example, it is formed in a size that covers all one side surface of the battery cell stack 10 formed in a large area, and a module mounting part 41 for mounting onto a battery pack is formed on one side, as shown in FIG. 8. Therefore, the weight of the end plate 40 can occupy a significant portion of the total weight of the battery module. In addition, since the upper plate 30 and the end plate 40 must be separately installed in addition to the module frame 20, there is a problem that the assembly process is complicated.

Further, in the case of an expandable battery module structure in which two cell blocks are arranged as in embodiments of the present disclosure, the weight of the battery module becomes considerable and the structure of the battery module may become relatively complicated, as compared with the battery module including the single cell block assembly shown in FIG. 8. Therefore, a compact structure for reducing the weight of the battery module and simplifying the structure is essentially required.

Thus, according to the embodiment of the present disclosure, the portions provided with the busbar frame 120 at the first and second cell block assemblies 100 and 200 can be covered by using the integrally formed upper plate 400. Thereby, the end plate provided in the conventional battery module can be eliminated, and both the upper surface and front and rear surfaces of the two cell block assemblies can be covered with one upper plate 400, thereby reducing the weight occupied by the conventional end plate and simplifying the structure of the expandable large area battery module.

According to the present embodiment, an insulating film 500 can be formed on the inside surface of the upper plate 400 as shown in FIG. 5. Conventionally, it was necessary to form a structure in which an insulating cover was additionally disposed between the end plate and the busbar frame, so that a separate process for assembling the insulating cover between the busbar frame and the end plate was required. On the other hand, according to the present embodiment, the insulating film 500 is attached to the inside surface of the upper plate 400 and thus, at the time of assembling the upper plate 400, the insulating film 500 can also be mounted onto the battery module at the same time, so that insulation of the battery module can be ensured only through a simple assembly process.

According to the present embodiment, a thermal conductive resin layer 700 may be formed between the cell block assembly including the first and second cell block assemblies 100 and 200 and the bottom part 310 of the module frame 300, as shown in FIG. 1. The thermal conductive resin layer 700 may be formed on the lower ends of the front and rear sides of the first cell block assembly 100 and the lower ends of the front and rear sides of the second cell block assembly 200, respectively. The thermal conductive resin layer 700 can perform the function of transferring the heat generated from the first and second cell block assemblies 100 and 200 to the outside. The thermal conductive resin layer may include a thermal resin.

According to the present embodiment, the cooling plate 600 may be disposed below the bottom part 310 of the module frame 300, as shown in FIG. 1. The battery module can be cooled by flowing the refrigerant in the inside of the cooling plate 600. The refrigerant flow path may be formed between the cooling plate 600 and the bottom part 310. Thereby, unlike the conventional cooling structure in which a separate heat sink is provided, a structure is adopted in which the coolant flows so that the bottom part 310 becomes a part of the coolant flow path, so that the cooling performance of the battery module can be improved and the battery module can be made lightweight.

Referring to FIGS. 5 and 6, the battery module according to the present embodiment further includes a cross beam that is disposed adjacent to the side surface part of the upper plate 400 covering the front and rear surfaces of the cell block assemblies 100 and 200, and is formed in a straight line shape 800. The upper plate 400 further includes a protruding bottom part 400P protruding from the side surface part. At this time, the cross beam 800 may be disposed on the protruding bottom part 400P.

A refrigerant flow path 800P is formed inside the cross beam 800 according to the present embodiment, and the refrigerant may flow through the refrigerant flow path. A sealing member 450 may be formed between the protruding bottom part 400P and the cross beam 800. The sealing member 450 may have a gasket structure. The sealing member 450 can prevent the refrigerant from leaking between the cross beam 800 and the protruding bottom part 400P of the upper plate 400 when the cross beam 800 functions as a cooling pipe through which the refrigerant flows.

The battery module according to the present embodiment may further include a mounting member 410 located between the first cell block assembly 100 and the second cell block assembly 200. The mounting member 410 can couple the upper plate 400 and the bottom part 310 of the module frame 300. More specifically, the upper plate 400 includes a connection part 401 that connects the separated portion of the first cell block assembly 100 and the second cell block assembly 200, and the mounting member 410 can couple the connection part 401 and the bottom part 310 of the module frame 300.

A mounting member 410 is located between the first cell block assembly 100 and the second cell block assembly 200, the first and second coupling members 420 and 430 are located in front and rear sides of the entire first and second cell block assemblies 100 and 200, and the coupling members 420 and 430 can couple the upper plate 400 and the module frame 300.

Looking closely at the coupling structure of the upper plate 400 and the module frame 300, the upper plate 400 includes an intermediate connection part 401 formed between the first and second cell block assemblies 100 and 200 and front and rear bottom parts formed in front and rear parts 402 and 403 of the entire first and second cell block assemblies 100 and 200. At this time, referring to FIG. 5, the intermediate connection part 401 is spaced apart from the bottom part 310 of the module frame 300, and the mounting member 410 can connect and couple the bottom part 401 between the connection part 401 and the bottom part 310 of the module frame 300.

The insulating film 500 may be separated from the connection part 401 between the first cell block assembly 100 and the second cell block assembly 200, and may be formed to contact the bottom part 310 of the module frame 300. The front and rear end bottom parts 402 and 403 are in contact with the bottom part 310 of the module frame 300, and can be coupled to each other by the first and second coupling members 420 and 430.

The connection part and bottom parts that can be coupled with the module frame 300 are formed at both ends and the middle portion of the upper plate 400, and the portion where the connection part, the bottom parts and the bottom part of the module frame 300 meet is coupled through the coupling members, so that the upper plate 400 and the module frame 300 can be firmly coupled. At the same time, it is possible to physically protect the two cell block assemblies located between the upper plate 400 and the module frame 300.

Figure 7:
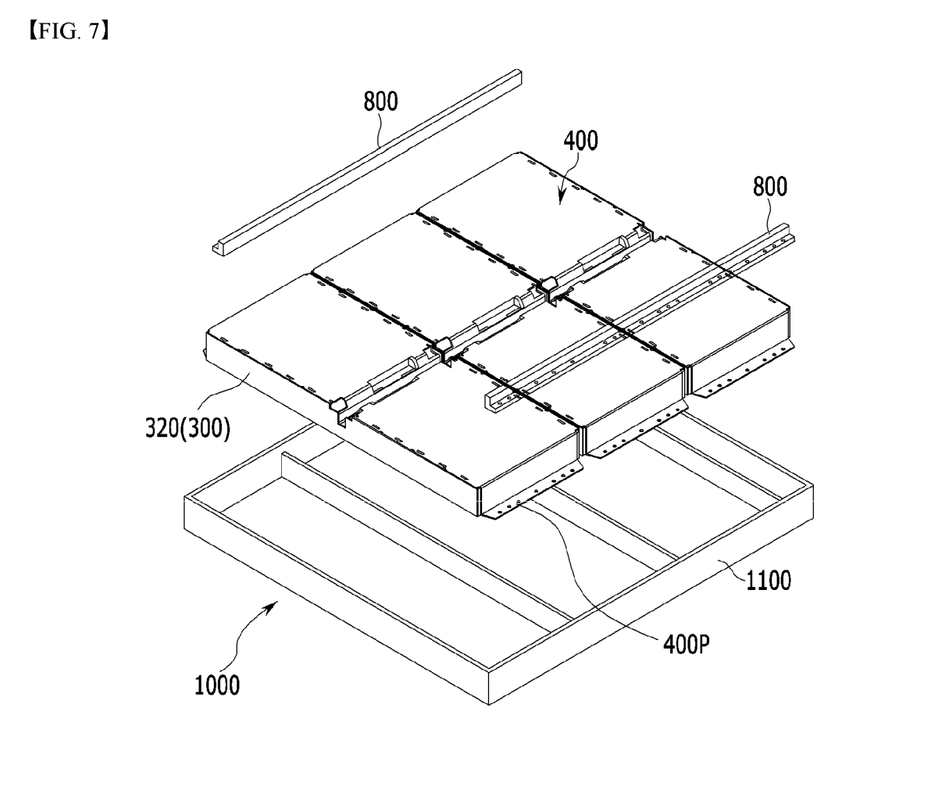
FIG. 7 is a perspective view showing a battery pack according to another embodiment of the present disclosure.

FIG. 7 is a perspective view showing a battery pack according to another embodiment of the present disclosure.

Referring to FIG. 7, the battery pack according to the present embodiment includes the above-mentioned battery module and the lower pack housing 1000 to which the battery module is mounted. As described above, the upper plate 400 further includes a protruding bottom part 400P that is protruded from the side surface part, wherein the protruding bottom part 400P may be adjacent to the side wall part 1100 of the lower pack housing 1000. The cross beam 800 disposed adjacent to the side surface part of the upper plate 400 and formed in a straight line shape is disposed between the side surface part of the upper plate 400 and the side wall part 1100 of the lower pack housing 1000, whereby the rigidity is complemented, the module space utilization is increased, and the cross beam 800 functions as a cooling flow path, which realizes structural simplification and weight reduction by straightening the flow path.

The first coupling member 420 described in FIGS. 5 and 6 is located between one side wall part 1100 of the lower pack housing 1000 and the first cell block assembly 100, and the second coupling member 430 may be located between the other side wall part 1100 of the lower pack housing 1000 and the second cell block assembly 200. At this time, the first coupling member 420 and the second coupling member 430 can couple the upper plate 400 to the bottom part 310 of the module frame 300 and/or the lower pack housing 1000.

Such a battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications can be carried out by those skilled in the art, without deviating from the spirit and scope of the principles of the invention described in the appended claims. Further, these modified embodiments should not be understood individually from the technical spirit or perspective of the present disclosure.

DESCRIPTION OF REFERENCE NUMERALS

100: first cell block assembly
110: battery cell stack
120: busbar frame
200: second cell block assembly
210: battery cell stack
300: module frame 400: upper plate
401: connection part
410: mounting member
420: first coupling member
430: second coupling member

The invention claimed is:

1. A battery module comprising:
a cell block assembly including:
a battery cell stack in which a plurality of battery cells are stacked; and
a busbar frame mounted on at least one of a front surface or a rear surface of the battery cell stack;
a module frame housing the cell block assembly, the module frame being open in a front surface and a rear surface thereof;
an upper plate covering an upper surface and the front and rear surfaces of the cell block assembly; and
a cross beam disposed adjacent to a side surface part of the upper plate covering the front and rear surfaces of the cell block assembly such that the upper plate is located between the cross beam and the module frame, the cross beam being formed in a straight line shape,
wherein the cell block assembly comprises a first cell block assembly and a second cell block assembly arranged side by side in a longitudinal direction of the plurality of battery cells, and
wherein the first cell block assembly and the second cell block assembly are arranged separately from each other so that the busbar frames mounted on the first and second cell block assemblies face each other.

2. The battery module according to claim 1, wherein:
the upper plate further comprises a protruding bottom part protruding from the side surface part.

3. The battery module according to claim 2, wherein:
the cross beam is disposed on the protruding bottom part.

4. The battery module according to claim 3, further comprising a sealing member formed between the protruding bottom part and the cross beam.

5. A battery module comprising:
a cell block assembly including:
a battery cell stack in which a plurality of battery cells are stacked; and
a busbar frame mounted on at least one of a front surface or a rear surface of the battery cell stack;
a module frame housing the cell block assembly, the module frame being open in a front surface and a rear surface thereof;
an upper plate covering an upper surface and the front and rear surfaces of the cell block assembly; and
a cross beam disposed adjacent to a side surface part of the upper plate covering the front and rear surfaces of the cell block assembly, the cross beam being formed in a straight line shape,
wherein the cell block assembly comprises a first cell block assembly and a second cell block assembly arranged side by side in a longitudinal direction of the plurality of battery cells,
wherein the first cell block assembly and the second cell block assembly are arranged separately from each other so that the busbar frames mounted on the first and second cell block assemblies face each other, and
wherein a refrigerant flow path is formed inside the cross beam to allow refrigerant to flow therethrough.

6. The battery module according to claim 1, wherein:
the first and second cell block assemblies are disposed along a direction perpendicular to a stacking direction of the battery cell stack.

7. The battery module according to claim 1, further comprising a cooling plate located below a bottom part of the module frame.

8. The battery module according to claim 1, wherein:
thermal conductive resin layers are formed between the first and second cell block assemblies and a bottom part of the module frame, and the thermal conductive resin layers are formed at a lower end on front and rear sides of the first cell block assembly and at a lower end on front and rear sides of the second cell block assembly, respectively.

9. The battery module according to claim 1, further comprising a mounting member located between the first cell block assembly and the second cell block assembly.

10. The battery module according to claim 9, wherein:
the upper plate comprises a connection part that connects spaced apart portions of the first cell block assembly and the second cell block assembly, and
the mounting member couples the connection part and a bottom part of the module frame.

11. A battery pack comprising:
the battery module according to claim 1, and
a lower pack housing to which the battery module is mounted,
wherein the upper plate further comprises a protruding bottom part protruding from the side surface part, and
wherein the protruding bottom part is adjacent to a first side wall part of the lower pack housing.

12. The battery pack according to claim 11, further comprising:
a first coupling member located between the first side wall part of the lower pack housing and the first cell block assembly, and
a second coupling member located between a second side wall part of the lower pack housing and the second cell block assembly,
wherein the first coupling member and the second coupling member couple the upper plate and a bottom part of the module frame or the lower pack housing.

* * * * *